HIGH VOLTAGE GENERATOR FOR CATHODE RAY TUBES

Filed Feb. 21, 1956 2 Sheets-Sheet 1

INVENTOR
Louis W. Parker

BY Mason & Hall

ATTORNEYS

INVENTOR
LOUIS W. PARKER
BY Moore & Hall
ATTORNEYS

United States Patent Office 2,898,506
Patented Aug. 4, 1959

2,898,506

HIGH VOLTAGE GENERATOR FOR CATHODE RAY TUBES

Louis W. Parker, Great Neck, N.Y.

Application February 21, 1956, Serial No. 566,916
12 Claims. (Cl. 315—1)

The present invention relates to television receivers, particularly of the type utilizing projection type cathode ray tubes; and is primarily concerned with improved structures for generating the relatively high voltages which are ordinarily required in the operation of such tubes.

As is well known, television receivers employing cathode ray tubes ordinarily require a source of relatively high voltage for such tubes. In the case of projection type cathode ray tubes, these voltages may be in the order of 25,000 to 75,000 volts, and at the present time such high voltages are customarily obtained through the use of stepped up pulse voltages generated in the horizontal deflection output circuits of the receiver. The pulse voltages so obtained ordinarily have a peak of approximately 15,000 volts, and these voltages are rectified, filtered, and applied to the second anode of the cathode ray tube. When higher voltages are required, particularly in the case of projection cathode ray tubes, this pulse voltage is generally doubled or tripled, for instance by voltage multipliers.

The aforementioned high voltages impose considerable design problems in television receivers, particularly with respect to corona, arc-over, dust accumulation, and safety insulation. These problems are particularly pronounced in projection cathode ray tube systems because of the extremely high potentials utilized in such systems. The present invention serves to obviate the foregoing difficulties through the provision of an improved high voltage generator adapted to cooperate with a cathode ray tube, particularly of the projection type; and this high voltage generator is of such construction that it may be disposed closely adjacent to and in intimate contact with the cathode ray tube itself thereby substantially to eliminate the aforementioned problems prevalent heretofore.

It is accordingly an object of the present invention to provide an improved high voltage generator for cathode ray tubes.

Another object of the present invention resides in the provision of a voltage generator structure adapted to be disposed in close proximity to a cathode ray tube whereby problems of corona, arc-over, dust accumulation and safety insulation are substantially eliminated.

A further object of the present invention resides in the provision of a voltage generator structure, particularly for use with cathode ray tubes, adapted to receive a relatively moderate high voltage from an external source and to thereafter multiply the said moderate voltage to much higher voltages for use in operation of the cathode ray tube.

Another object of the present invention resides in the provision of an improved high voltage generator which is extremely compact and which contains substantially all the components required for multiplication of an external voltage to a relatively high operating voltage within a single envelope.

Another object of the present invention resides in the provision of an improved high voltage generator adapted to be removably disposed in close proximity to a cathode ray tube, whereby either the said power supply or cathode ray tube may be replaced, if defective, without the necessity of destroying otherwise effective components.

A still further object of the present invention resides in the provision of an improved voltage multiplier circuit which is oil-immersed in a unitary envelope.

A still further object of the present invention resides in the provision of a unitary envelope which includes structural elements adapted to support and interconnect a plurality of components comprising a high voltage generator.

A still further object of the present invention resides in the provision of cathode ray tube devices, and particularly projection cathode ray tube devices, which exhibit better operating characteristics and which are less subject to operating failure than has been the case in the past.

In providing for the foregoing objects and advantages, the present invention contemplates the provision of a ring-like envelope adapted to conform in internal configuration to the external configuration of a cathode ray tube, whereby the said envelope may be disposed in close proximity with the said cathode ray tube in surrounding relation thereto. The aforementioned envelope is further adapted to support, internally thereof, a plurality of components comprising a voltage multiplier or other form of high voltage generator, and these components may comprise, for instance, rectifiers, resistors, capacitors, and induction coils necessary in the operation of the voltage multiplier or other rectifier, all of which components are immersed in an insulating oil or in an inert gas within the said envelope. The envelope further includes electrical connections cooperating with complementary connections in the cathode ray tube itself; and the over-all configuration of envelope and connections is such that the sealed and self-contained voltage generator may be removably placed in air-free contact with the cathode ray tube envelope thereby to eliminate problems of corona, arc-over, dust accumulation, and safety insulation.

In operation, a moderately high voltage may be generated by circuits external of the high voltage generator described above, and these moderate voltages may thereafter be multiplied in the oil-immersed equipment comprising the novel voltage generator of the present invention, whereby the extremely high voltages required in various cathode ray tube installations do not appear in the system except in close proximity to the cathode ray tube itself. The physical configuration of the apparatus, further, is such that should either the cathode ray tube or the self-contained high voltage power supply become defective, such a defective unit may be discarded and replaced without necessarily destroying the non-defective unit cooperating therewith. These considerations thus result in a cathode ray tube system which is extremely compact, relatively inexpensive, and which completely eliminates problems present heretofore attendant the generation of very high voltages.

The foregoing objects, advantages, construction and operation of the present invention will become more readily apparent from the following description and accompanying drawings, in which.

Figures 1, 2, 3:
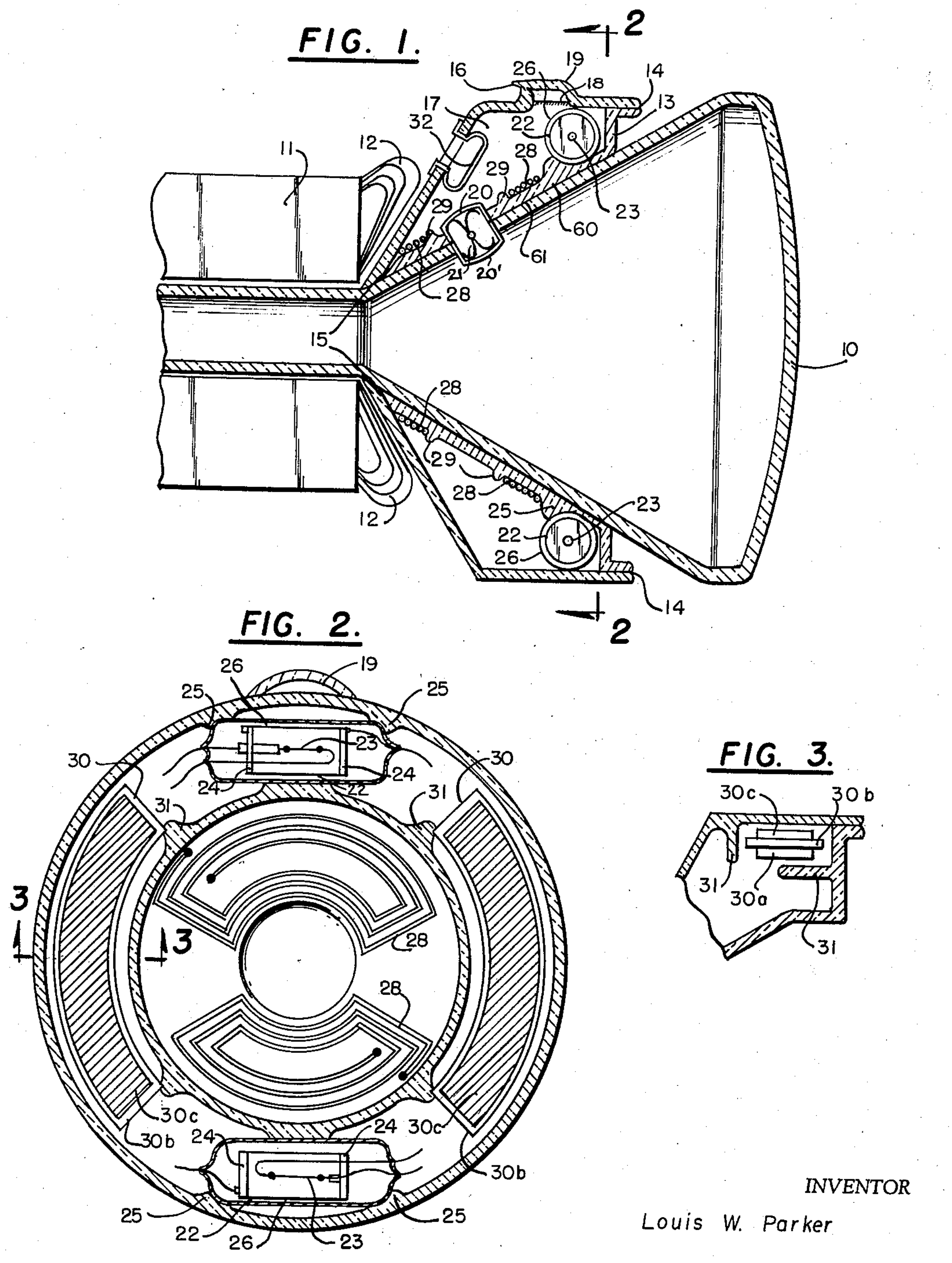
Figure 1 is a cross-sectional side view of a cathode ray tube and high voltage generator in accordance with the present invention.
Figure 2 is a view taken on line 2—2 of Figure 1, illustrating the relative disposition of several components which may comprise the improved high voltage generator of the present invention.
Figure 3 is a view taken on line 3—3 of Figure 2, illustrating the form and disposition of an improved capacitor which may be employed in the voltage generating equipment of the present invention.

Referring now to Figure 1, it will be seen that in accordance with the present invention a cathode ray tube 10, particularly of the projection type, may have a deflection yoke 11 mounted adjacent the neck thereof, and a sealed unitary high voltage generator assembly 13 disposed adjacent the bulbous portion of the said cathode ray tube. High voltage generator 13 comprises a unitary envelope which may be made, for instance, of glass in two separate sections, and these sections can be joined together along junctions 14 and 15 thereby to effect an enclosed volume or chamber 17 closely adjacent the cathode ray tube 10 and adapted to support a plurality of components comprising a voltage generator or voltage multiplier therein. The junctions 14 and 15 can be seam-welded or can be cemented together with a suitable cement such as de Khotinsky cement. When a cement is used for sealing the said junctions, the said cement may be selectively loosened, for instance by the application of heat, whereby the voltage generator 13 can be disassembled if required to replace a defective component therein.

The enclosed volume or chamber 17 may be filled, through a port 16, with a suitable insulating oil 18, whereafter the said port 16 may be closed or sealed. The said oil 18 is preferably heated during the aforementioned filling operation, whereby possible breakage of the glass envelope comprising voltage generator 13, due to heat expansion of the oil 18 under normal operating conditions, is avoided. In addition, the envelope comprising voltage generator 13 includes a bulb or bubble 19 containing air or other gases at less than atmospheric pressure, thereby to permit possible expansion of the oil 18 without the aforementioned possible breakage.

The shape of the envelope comprising high voltage generator 13 is such that its inner annular surface 60 conforms with, and is adapted to closely mate with, the outer surface 61 of cathode ray tube 10 whereby an extremely close fit between the cathode ray tube 10 and the high voltage generator 13 may be effected. In addition, surface 60 of high voltage generator 13 includes a conductive button 20 sealed therein, while the said surface 61 of the cathode ray tube 10 contains a complementary conductive button 20'; and contact between the said conductive buttons 20 and 20' may be positively maintained by a spring contact 21 inserted therebetween as illustrated in Figure 1. The arrangement is such, therefore, that the high voltage generator 13 is disposed in intimate contact adjacent the external envelope of cathode ray tube 10, and extremely short electrical contacts may be effected in the vicinity of the abutting envelopes comprising the high voltage generator and cathode ray tube.

In practice, the area of contact between the high voltage generator 13 and cathode ray tube 10 may be made air-tight and dust-free; and in addition, corona and arcing around the anode button 20' may be completely prevented by filling all the voids between the picture tube 10 and the high voltage generator 13 with a plastic-type cement pumped therebetween under vacuum, and the cement used preferably comprises a material which may, if desired, be loosened by the application of heat. It should be noted that this procedure, in addition to achieving the desired contact and close proximity between the generator 13 and tube 10, further eliminates the need for a special leakage resisting coating on the surface of picture tube 10; and the separable nature of the generator 13 and tube 10 further permits either unit to be replaced without detriment to the other unit. This latter situation should be compared with high voltage generating equipment suggested heretofore, in an attempt to avoid the problems attendant high voltage utilization, wherein the picture tube and voltage generating equipment were contained in a single envelope. For, in these latter constructions, defective operation of either the high voltage generator or the cathode ray tube necessarily resulted in destruction of components which were otherwise operable.

Returning now to the representation in Figures 1 and 2, it will be seen that the high voltage generator 13 may contain a plurality of components within the chamber 17 and immersed in the oil or inert gas 18; and these components may comprise, for instance, voltage rectifiers, capacitors, resistors, and induction coils. Typical voltage rectifiers may comprise evacuated envelopes 26 supported within the high voltage generator 13 by molded projections 25 integrally formed therewith; and each such evacuated glass envelope 26 comprising the voltage rectifier structures, may contain, internally thereof, an anode 22, a filament 23, and means for supporting the filament within the anode, such as mica disks 24 (see particularly Figure 2).

It will be noted that two rectifiers 26 are illustrated as supported within the envelope comprising high voltage generator 13; but in practice, a single rectifier or more than two rectifiers may be disposed in an analogous fashion, depending upon the particular voltage requirements and the particular voltage generation circuit being employed.

Also disposed within the envelope comprising high voltage generator 13, are means for heating the filaments 23 of the aforementioned high voltage rectifiers 26; and these means may comprise inductances such as 28 supported internally of the generator envelope by integral projections such as 29 within the field of deflection yoke 11. In this respect it should be noted that the shape of inductances, such as 28, may be as illustrated in Figure 2 whereby the said inductances follow the contour of the forwardly projecting portion 12 of deflection yokes 11; and this forward projection or bulge 12 of the deflection coils 11 may, in addition, be so shaped as to project for an appreciable distance over the filament inductances 28 thereby to effect a substantial coupling of energy between the coil portion 12 and the filament coils 28 serving to heat the filaments 23 of rectifiers 26.

The number of turns actually employed in the inductances 28 will, of course, depend upon the particular rectifiers employed within the envelope comprising high voltage generator 13 as well as upon the degree of coupling and amount of energy coupled between the coils 12 and 28; and the actual number of turns in the inductances 28 must, therefore, be determined by the particular design considerations involved in a given application. Inductances 28 may comprise insulated wire coils wrapped internally of the envelope comprising high voltage generator 13, or may in the alternative take the form of printed circuits deposited on a sheet of insulating material or on the inner surface of the high voltage generator envelope. In practice, each high voltage rectifier 26, contained within the chamber 17 of high voltage generator 13, preferably has its own filament inductance 28.

Another component contained within the envelope of generator 13 and illustrated particularly in Figures 2 and 3, may comprise high voltage capacitors 30. Such capacitors are ordinarily a portion of high voltage generator and multiplier devices; and the disposition of such capacitors within the high voltage generator avoids the necessity of connecting high voltages to the outside of the self-contained generator unit. The capacitors 30 may comprise metal plates **30*a* and 30*c* (see Figure 3), separated from one another by a dielectric body 30*b* which may be of glass, mica, barium titanate, or other ceramic construction; and the metal plates 30*a* and 30*c* may in fact be plated by suitable printed circuitry techniques onto opposing sides of the dielectric body 30*b***. As will be seen from an examination of Figure 2, the shape of high voltage capacitors 30 again conforms to that of the envelope comprising generator 13, and these capacitors may be supported in place by tabs or projections 31, molded into the envelope of the high voltage generator.

It will be appreciated from the foregoing that the several components comprising a high voltage generator or voltage multiplier are supported within the unitary high voltage generator envelope; and these components may be interconnected electrically in a desired configuration. Such interconnection of components may be effected by wires disposed within the envelope of the generator, and these wires may, if desired, also be supported adjacent the walls of the envelope by tabs molded therewith similar to those tabs already described for support of the other components. In the alternative, and to facilitate construction of the device, the desired electrical interconnections may take the form of conductive strips deposited on the inside of glass envelope 13, whereby contact and electrical continuity between the several voltage generator components can be effected through the agency of conductive projections or fingers, in contact with the said strips. In addition, the generator envelope 13 includes one or more contact buttons, such as 32, to permit AC pulse voltages to be brought into the high voltage generator from external circuits.

Figure 4:
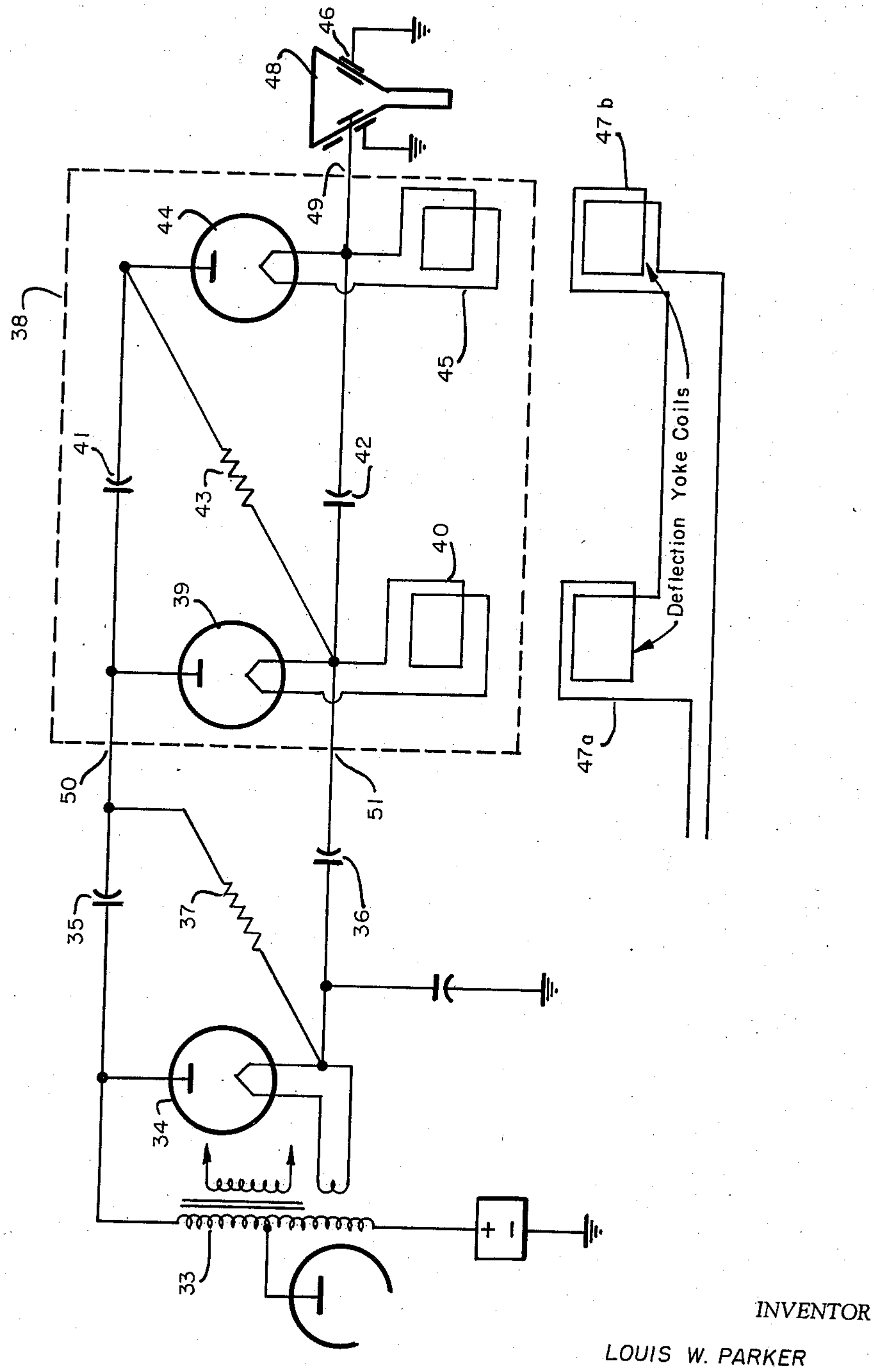
Figure 4 is a schematic diagram of one form of voltage multiplier which may be utilized in the arrangement of Figures 1 through 3.

As mentioned previously, various electrical circuits may be disposed within the envelope comprising high voltage generator 13; and one particular circuit comprising a voltage multiplier is illustrated in Figure 4. Referring to Figure 4, it will be seen that the high voltage generator unit, which is now designated as 38, may comprise a pair of rectifiers 39 and 44 having their anodes interconnected by a capacitor 41 and having their cathodes or filaments interconnected by a capacitor 42. In addition, the filament of rectifier 39 is interconnected with the anode of rectifier 44 by a resistor 43; and when oil-immersed equipment is employed, the resistor 43 should be so chosen that it operates satisfactorily in oil. Filament energization for the rectifiers 39 and 44 may be supplied by filament inductances 40 and 45 which are inductively coupled through the envelope of generator 38 to external deflection yoke coils 47*a* and 47*b*.

It will be appreciated that the particular form of circuit thus disposed within the high voltage generator 38, together with the circuit preceding it, comprises a voltage tripler; and the operation of such circuits is well known. The rectifiers 39 and 44, of course, conform to rectifiers 26, illustrated in Figures 1 and 2. Capacitors 41 and 42 conform to capacitors 30; and filament inductances 40 and 45 conform to inductances 28; all of which have been described previously.

Under some circumstances, greater voltage multiplication than tripling is required, and when this is the case, additional stages of multiplication may be placed within the envelope comprising high voltage generator 38. In the alternative, and in the particular example illustrated in Figure 4, an additional high voltage rectifier 34 may be disposed external of the envelope comprising high voltage generator 38. This additional rectifier comprises a further multiplier stage, and although this particular stage is external of the unitary high voltage generator, it has an output voltage which is only one-third of the final D.C. output from the system. This first stage, comprising rectifier 34, may thus be insulated without excessive cost or difficulty, and the troubles encountered at higher voltages ordinarily required in the operation of the cathode ray tube are avoided.

The particular representation in Figure 4 is thus meant to be broadly illustrative of the concept of a voltage multiplier entirely disposed within a unitary envelope; or in the alternative, a voltage multiplier which has stages operating at reduced voltages disposed external of an envelope which in turn contains stages operating at considerably higher voltages. If additional voltage multiplication is desired, further stages may be disposed externally of the high voltage generator 38; or they may be built into the said high voltage generator 38. By the same token, capacitors 35 and 36 and resistors 37, which are illustrated in Figure 4 as disposed external of the generator 38, may, if desired, be included within the high voltage generator unit in a manner analogous to those already described.

Energization for the entire system may be obtained from transformer 33, which is meant to illustrate a portion of the horizontal output transformer or of the pulse output transformer, or of the RF power supply output transformer normally to be found in television receivers. In addition, inputs to the generator 38 are obtained at points 50 and 51, and these particular connection points may take the form of conductive buttons such as 32, illustrated in Figure 1.

Coupling of voltages from the high voltage generator 38 to cathode ray tube 48, takes place at point 49, which point may take the physical configuration of buttons 20, 20′ and spring member 21, also illustrated in Figure 1; and the coupling network to cathode ray tube 48 may include a capacitor 46 formed, for instance, by aquadag coatings disposed on the internal and external surfaces of the cathode ray tube envelope, whereby the said envelope itself acts as a dielectric for capacitor 46.

While a preferred embodiment of the present invention has been described, many variations will be suggested to those skilled in the art. In particular, various forms of voltage generating or multiplying circuits may be physically disposed within the unitary high voltage generator in a manner similar to that described; and the actual relative disposition of components will accordingly depend upon the particular circuits utilized. In addition, while a preferred embodiment of the present invention contemplates the oil-immersion of the several components within the high voltage generator of the present invention, this high voltage generator may, if desired, contain nitrogen or other inert gases under pressure, and in fact the envelope 13 may be evacuated without departing from the principles of the present invention. Also, while the voltage generator envelope of the present invention preferably surrounds a cathode ray tube envelope in the manner described, the invention may be practiced in conjunction with a voltage generator which is closely adjacent a limited portion only of the cathode ray tube. It should further be noted that cathode ray tubes, such as may be employed in conjunction with the voltage generator of the present invention, may have various cross-sectional configurations, e.g. round, square, rectangular, etc. The voltage generator envelope may accordingly also have various configurations adapted to conform to the particular cathode ray tube being employed, and the term "toroidal" envelope used in the appended claims is meant therefore to include broadly various configurations of generator envelope having a central aperture which is circular, rectangular, or of other shape, and adapted to receive a cathode ray tube of complementary configuration in close proximity thereto.

Further modifications will be suggested to those skilled in the art and it must therefore be stressed that the foregoing description is meant to be illustrative only and should not be considered limitative of my invention. All such modifications as are in accord with the principles described are meant to fall within the scope of the appended claims.

Having thus described my invention, I claim:

1. In a cathode ray tube system, a cathode ray tube having an envelope, a high voltage generator comprising a unitary sealed substantially toroidal envelope, a plurality of electrical components in said toroidal envelope, said components comprising rectifier means and a plurality of individual impedance elements physically supported within said generator envelope, conductor means within said envelope electrically interconnecting said rectifier means and impedance elements in a voltage multiplier circuit arrangement, said toroidal generator envelope being separably disposed in surrounding relation to said cathode ray tube envelope with an external surface of said generator envelope being in closely conforming substantially air-free proximity to the external surface of said cathode ray tube envelope, complementary terminals in the said closely conforming external surfaces of said generator and cathode ray tube envelopes for effecting electrical connections between a portion of said voltage multiplier circuit arrangement and said cathode ray tube, a further terminal in said generator envelope for providing electrical connection between said voltage multiplier circuit arrangement and circuits external of said generator and cathode ray tube envelopes, and conductor means connecting a portion of said voltage multiplier circuit arrangement to said further terminal on the interior of said generator envelope.

2. The combination of claim 1 wherein said generator envelope is substantially filled with an insulating oil.

3. The combination of claim 1 wherein said generator envelope is disposed in surrounding relation to the bulbous portion of said cathode ray tube, and a layer of sealing material between the envelopes of said generator and said cathode ray tube, said sealing material comprising a composition preventing the formation of corona discharge and leakage of high electric potential.

4. The combination of claim 1 wherein said circuits external of said generator and cathode ray tube envelopes comprise an additional voltage multiplier stage external of said generator envelope and having an output voltage substantially less than that to be supplied to said cathode ray tube, and means coupling the output of said further stage to said multiplier circuit arrangement within said generator envelope via said further terminal.

5. The combination of claim 1 wherein said cathode ray tube and generator envelopes are fixedly secured to one another by a thermoplastic cementing material.

6. The combination of claim 1 wherein said high voltage generator envelope comprises plural envelope portions secured to one another by a thermoplastic cementing material.

7. The combination of claim 1 wherein said high voltage generator envelope contains a gas under pressure.

8. The combination of claim 1 wherein said high voltage generator envelope is evacuated.

9. In combination, a cathode ray tube having a deflection coil, a high voltage generator comprising a sealed unitary envelope separably disposed closely adjacent to said cathode ray tube on the exterior thereof, said deflection coil also being disposed closely adjacent to said cathode ray tube exterior to said sealed unitary envelope, a high voltage generator circuit arrangement physically supported within said generator envelope adjacent the internal walls of said envelope, an input terminal sealed in said envelope and interconnected on the interior of said envelope to the input of said voltage generator circuit arrangement, an output terminal sealed in said envelope and interconnected on the interior of said envelope to the output of said voltage generator circuit arrangement, said voltage generator circuit arrangement including a rectifier tube supported on the interior of said envelope, and an inductance coil mounted within said envelope and coupled to the cathode of said rectifier tube within said sealed envelope, said inductance coil being inductively coupled through the walls of said sealed envelope to said deflection coil of said cathode ray tube for energizing said rectifier tube cathode.

10. The combination of claim 1 wherein said voltage multiplier circuit arrangement includes a voltage rectifier tube having a cathode, an induction coil within said auxiliary envelope connected to said cathode, and a deflection coil external of said auxiliary envelope and adjacent the neck of said cathode ray tube, said deflection coil including a portion extending adjacent the external walls of said auxiliary envelope in proximity to said induction coil whereby said rectifier cathode is energized by the inductive coupling of energy from said deflection coil to said induction coil through the walls of said envelope.

11. In a cathode ray tube system, a cathode ray tube having an envelope, a voltage multiplier circuit arrangement physically supported within a further completely enclosed and sealed envelope, said further envelope being separably disposed closely adjacent to said cathode ray tube envelope in substantially air-free proximity to said cathode ray tube envelope thereby to avoid voltage breakdown in the region between said envelopes, a separable electrical connection extending between the adjacent walls of said cathode ray tube and further envelopes for coupling the output of said voltage multiplier circuit arrangement to said cathode ray tube, said separable connection being short in length and being limited to the adjacent walls of said two envelopes thereby to inhibit formation of corona adjacent said connection, terminal means extending through said further envelope and connected on the interior of said envelope to the input of said voltage multiplier circuit arrangement, and means exterior of said further envelope for applying a voltage to said terminal means having a magnitude less than that to be applied to said cathode ray tube.

12. The combination of claim 1 including insulating means filling substantially all voids between said complementary terminals thereby to prevent arcing and corona between said complementary terminals.

References Cited in the file of this patent

UNITED STATES PATENTS

| | | |
|---|---|---|
| 1,639,805 | McCullough | Aug. 23, 1927 |
| 1,925,558 | Foster | Sept. 5, 1933 |
| 2,656,486 | Giordano | Oct. 20, 1953 |
| 2,694,784 | Reinhard et al. | Nov. 16, 1954 |